US010267077B2

(12) United States Patent
Nishida et al.

(10) Patent No.: US 10,267,077 B2
(45) Date of Patent: Apr. 23, 2019

(54) ROTATION MECHANISM

(71) Applicant: NIFCO INC., Yokosuka-shi, Kanagawa (JP)

(72) Inventors: Ryuhei Nishida, Yokosuka (JP); Tomoaki Nagayama, Yokosuka (JP)

(73) Assignee: NIFCO INC., Yokosuka-Shi, Kanagawa (JP)

( * ) Notice: Subject to any disclaimer, the term of this patent is extended or adjusted under 35 U.S.C. 154(b) by 0 days.

(21) Appl. No.: 15/554,944

(22) PCT Filed: Feb. 19, 2016

(86) PCT No.: PCT/JP2016/054942
§ 371 (c)(1),
(2) Date: Aug. 31, 2017

(87) PCT Pub. No.: WO2016/140086
PCT Pub. Date: Sep. 9, 2016

(65) Prior Publication Data
US 2018/0087306 A1   Mar. 29, 2018

(30) Foreign Application Priority Data

Mar. 3, 2015  (JP) ................................. 2015-041569

(51) Int. Cl.
*E05F 1/12* (2006.01)
*F16C 11/04* (2006.01)
(Continued)

(52) U.S. Cl.
CPC ............ *E05F 1/1207* (2013.01); *B60N 3/023* (2013.01); *E05F 1/12* (2013.01); *F16C 11/04* (2013.01); *B60N 3/102* (2013.01); *B60N 3/106* (2013.01)

(58) Field of Classification Search
CPC ........... E05F 1/1207; E05F 1/12; F16C 11/04; B60N 3/023; B60N 3/102; E05B 1/0053;
(Continued)

(56) References Cited

U.S. PATENT DOCUMENTS 5,975,606 A * 11/1999 Forbes ................... B60N 3/023
16/421
7,617,571 B2 * 11/2009 Lee ........................ B60N 3/023
16/412
(Continued)

FOREIGN PATENT DOCUMENTS

CN    102971116 A    3/2013
CN    203864508 U    10/2014
(Continued)

OTHER PUBLICATIONS

PCT/ISA/210, "International Search Report for International Application No. PCT/JP2016/054942", dated May 10, 2016.
(Continued)

*Primary Examiner* — Roberta S Delisle
(74) *Attorney, Agent, or Firm* — Manabu Kanesaka

(57) ABSTRACT

This rotation mechanism is provided with: a first member; a second member which is rotatably coupled to the first member by a pivot; and a torsion coil spring which applies force such that one from among the first member and the second member is rotated relative to the other. Any one of the first member and the second member is provided with a torsion coil spring-accommodating part in which a pair of protrusions facing each other in the axial direction of the pivot is provided. The pair of protrusions are configured so as to hold, around the axes of the protrusions, the two end portions of the coil shape of the torsion coil spring, and so
(Continued)

as to protrude while being displaced in the radial direction of the coil shapes forming the two ends, with respect to the axial direction of the pivot.

11 Claims, 10 Drawing Sheets

(51) Int. Cl.
*B60N 3/02* (2006.01)
*B60N 3/10* (2006.01)

(58) Field of Classification Search
CPC ... A45C 13/26; A45C 13/30; A45C 2013/226; A45F 5/10
USPC ............ 16/114.1, 419, 424–425, 444
See application file for complete search history.

(56) References Cited

U.S. PATENT DOCUMENTS

| | | | | |
|---|---|---|---|---|
| 7,988,115 B2* | 8/2011 | Lee | ............ | B60R 7/10 16/438 |
| 8,146,208 B2* | 4/2012 | Kajio | ............ | B60N 3/023 16/444 |
| 8,245,357 B2* | 8/2012 | Kajio | ............ | B60N 3/023 16/444 |
| 8,307,516 B2* | 11/2012 | Bartnick | ............ | B60N 3/023 16/110.1 |
| 8,661,622 B2 | 3/2014 | Takai et al. | | |
| 8,732,911 B2* | 5/2014 | Kajio | ............ | B60N 3/023 16/438 |
| 2002/0020042 A1* | 2/2002 | Kurachi | ............ | B60N 3/023 16/438 |
| 2003/0126718 A1 | 7/2003 | Yamamoto et al. | | |
| 2008/0098563 A1 | 5/2008 | Lee et al. | | |
| 2011/0247175 A1 | 10/2011 | Girard et al. | | |
| 2012/0074278 A1* | 3/2012 | Hamaguchi | ............ | B60N 3/023 248/221.11 |
| 2013/0106121 A1 | 5/2013 | Hasegawa | | |
| 2013/0219795 A1 | 8/2013 | Fukumoto | | |
| 2016/0236602 A1 | 8/2016 | Nagayama | | |

FOREIGN PATENT DOCUMENTS

| | | |
|---|---|---|
| JP | 2003-200770 A | 7/2003 |
| JP | 2006-341800 A | 12/2006 |
| JP | 2011-235822 A | 11/2011 |
| JP | 2013-023073 A | 2/2013 |
| JP | 2015-85727 A | 5/2015 |

OTHER PUBLICATIONS

PCT/ISA/237, "Written Opinion of the International Searching Authority for International Application No. PCT/JP2016/054942", dated May 10, 2016.
Europe Patent Office, "Search Report for European Patent Application No. 16758780.7," dated Sep. 28, 2018.
China Patent Office, "Office Action for Chinese Patent Application No. 201680013496.3," dated Feb. 25, 2019.

* cited by examiner

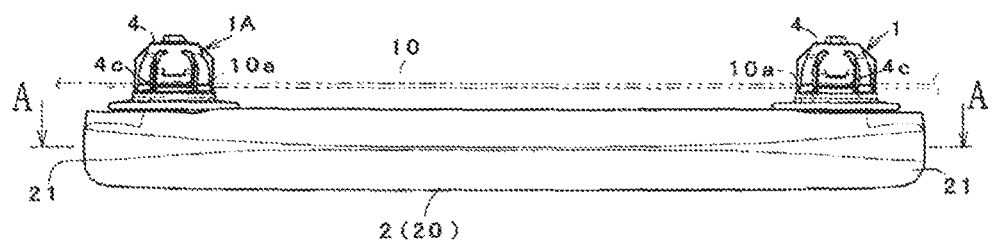
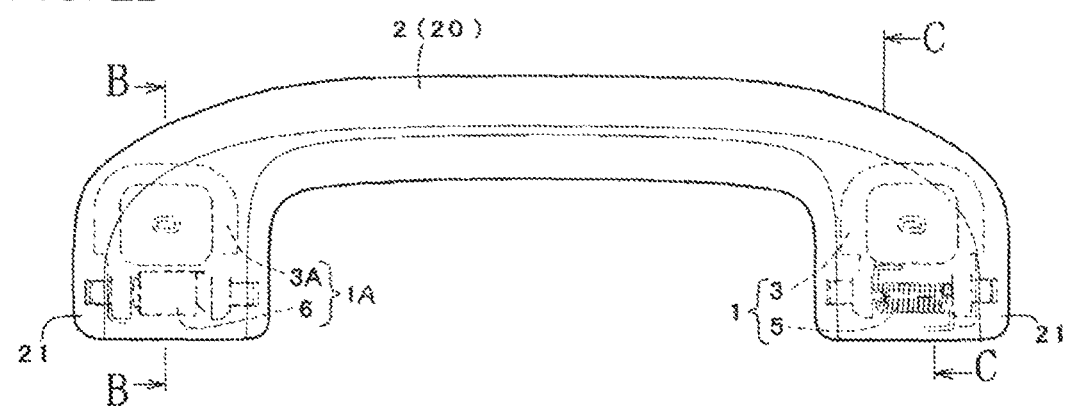
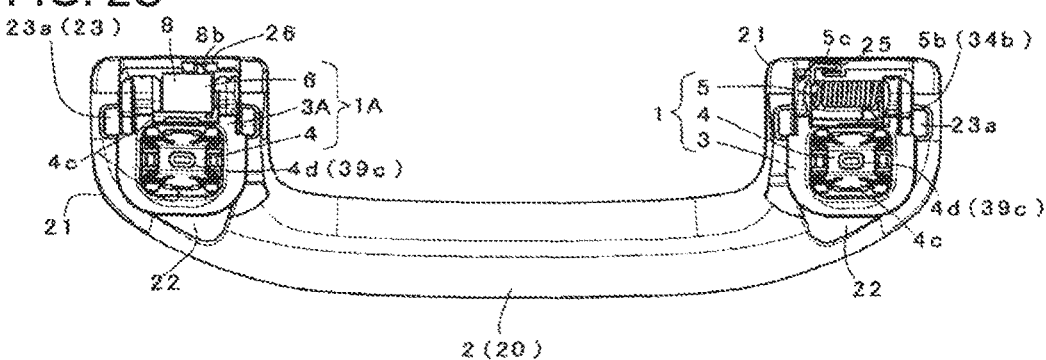

ial field

The present invention relates to an improvement technique of a rotation mechanism for rotatably coupling a first member and a second member, particularly, a rotation mechanism of a type which includes an urging means for urging one member so as to rotate relative to the other member and adopts a torsion coil spring as the urging means.

BACKGROUND ART

There is a rotation mechanism which includes a cover 3 constituting a cup holder body, a container restraining flap 4 rotatably supported on the cover 3 by a shaft portion (corresponding to the pivot of the present invention) 42, and a torsion coil spring 5 for urging one of the cover 3 and the flap 4 so as to rotate relative to the other, as exemplified in FIG. 9 (configuration disclosed in Patent Document 1). Here, the cover 3 has a pair of support portions 34 and shaft holes 35 coaxially provided in the support portions 34. The flap 4 has a torsion coil spring accommodating part, i.e., an accommodating space between leg parts 41, protrusions 43 each provided to face an inner surface side of each leg part 41, and the shaft portions 42 each provided on an axis of each protrusion 43 on an outer surface side of each leg portion 41. The torsion coil spring 5 has abutting portions formed by extending both end portions of a coil shape. Then, the flap 4 is rotatably coupled to both support portions 34 through the fitting of the shaft portions 42 and the shaft holes 35. The torsion coil spring 5 is disposed such that both end portions of the coil shape are held around the axes of the corresponding protrusions 43 and each abutting portion abuts against different one of the cover 3 and the flap 4.

In the case where the spring torque of the above torsion coil spring is high, the spring deformation becomes large when the flap 4 is rotated against the urging force of the torsion coil spring 5. Thus, there is a possibility that end portions of the coil shape are disengaged from the protrusions 43. As measures against this, it is also conceivable that the protrusions 43 to be fitted into the end portions of the coil shape are lengthened such that the end portions are not easily disengaged. However, when the protrusions 43 are lengthened, the torsion coil spring cannot be held around the axes of the protrusions.

As another measures, instead of a configuration in which the torsion coil spring is held by a pair of protrusions, a shaft 5 may be used to hold the torsion coil spring around the axis of the shaft and thus to prevent the detachment of the torsion coil spring, as exemplified in FIG. 10 (configuration disclosed in Patent Document 2). In FIG. 10, a reference numeral 2 indicates a grip body, reference numerals 3A and 3B indicate holding bodies (corresponding to the attachment base of the present invention) for rotatably coupling and holding the grip body 2 via the shaft 5, and reference numerals 4 and 5 indicate shafts for rotatably coupling the grip body 2 to the holding bodies 3A, 3B.

CITATION LIST

Patent Document

Patent Document 1: Japanese Patent Laid-Open Publication No. 2006-341800

Patent Document 1: Japanese Patent Laid-Open Publication No. 2003-200770

DISCLOSURE OF INVENTION

Problems to be Solved by Invention

Although the mechanism in FIG. 9 among the above rotation mechanisms is simple, there is a possibility that the torsion coil spring is disengaged from the protrusions on both sides. Although the mechanism in FIG. 10 can eliminate the possibility of detachment of the torsion coil spring by the shafts, the number of parts is increased, and the weight is also increased. In short, each mechanism has its advantages and disadvantages and is not yet satisfactory.

From the above background, an object of the present invention is to improve the quality by making it difficult for the torsion coil spring with high spring torque to be disengaged while employing the former rotation mechanism. Another object is to make it possible to maintain good assembling ability. Still other objects are will be clarified in the following description.

Means for Solving the Problems

In order to achieve the above object, a rotation mechanism of the present invention includes a first member; a second member which is rotatably coupled to the first member by a pivot (this pivot is fitted into the shaft hole); and a torsion coil spring that urges one of the first member and the second member to rotate relative to the other. Any one of the first member and the second member has a torsion coil spring accommodating part in which a pair of protrusions facing each other in an axial direction of the pivot is provided. The pair of protrusions holds both end portions of the coil shape of the torsion coil spring around axes of the protrusions and are displaced from each other in a radial direction of the coil shape forming the both end portions with respect to the axial direction of the pivot and protrude.

In order to achieve the above object, a rotation mechanism according to another example of the present invention includes a first member; a second member which is rotatably coupled to the first member by a pivot (this pivot is fitted into the shaft hole); and a torsion coil spring that urges one of the first member and the second member to rotate relative to the other. Any one of the first member and the second member has a torsion coil spring accommodating part in which a pair of protrusions facing each other in an axial direction of the pivot is provided. The torsion coil spring has abutting portions formed by extending both end portions of the coil shape, and each of the abutting portions is arranged so as to abut against different one of the first member and the second member. The pair of protrusions holds the both end portions of the coil shape of the torsion coil spring around the axes of the protrusions, and at least one of the protrusions has a spring holding portion provided at a place receiving reaction force from the corresponding abutting portion side of the torsion coil spring.

In the above (1) and (2), the expression "one of the first member and the second member is urged so as to rotate relative to the other" includes the configuration in which the second member (e.g., the grip body 2) is rotated relative to the first member (e.g., the attachment bases 1, 1A or the holding members 3, 3A) against the urging force, as in the embodiment, and the configuration in which the second member and the first member are rotated together against the urging force. Further, the expression "a pair of protrusions facing each other in the axial direction of the pivots" indicates a relationship in which a pair of protrusions 37, 38 faces each other in the axial direction X of the pivots 36, 36, i.e., a relationship in which a pair of protrusions 37, 38 protrude in the axial direction X and substantially faces each other, as exemplified in FIG. 6C.

It is more preferable that the present invention as described above is embodiment as specified in the following (3) to (6).

(3) Each of the pair of protrusions has an inclined surface which is provided on the same side and causes the torsion coil spring to be easily compressed in an axial direction when the both end portions of the coil shape of the torsion coil spring are held around the corresponding axis.

(4) The spring holding portion has a recessed or notched shape formed around the protrusions.

(5) The protrusions are integrally formed with the first member or the second member.

(6) The first member is an attachment base to be attached to a body panel, and the second member is a grip body.

Effects of Invention

In the invention of the above (1), as shown in FIGS. 7A and 7B, the protrusions 37, 38 are displaced from each other in the radial direction of the coil shape forming both end portions 5a of the torsion coil spring, i.e., the Z direction in FIG. 7A with respect to the axial direction X of the pivots 36, 36. Therefore, the movement in the radial direction of the torsion coil spring is restricted by both protrusions. In this way, even the torsion coil spring with high spring torque is unlikely to be disengaged, and thus, the unintentional detachment of the torsion coil spring can be prevented, thereby improving the quality.

In the invention of the above (2), as shown in FIGS. 8A and 8B, the attachment base 1 or the holding member 3 is the first member, and the grip body 2 is the second member. In the torsion coil spring 5, the abutting portion 5b serves as a fixed end side, and the abutting portion 5c serves as an action end side receiving a reaction force when the grip body 2 is rotated with respect to the attachment base 1 against the urging force. In this invention, at least the action end on the movable side, which is the abutting portion 5c, is restricted by the spring holding portion 38b. Therefore, even the torsion coil spring with high spring torque is unlikely to be disengaged, and thus, the unintentional detachment of the torsion coil spring can be prevented, thereby improving the quality.

In the invention of the above (3), each of the protrusions has the inclined surface to make it easy to compress the torsion coil spring in the axial direction when the both end portions of the coil shape of the torsion coil spring are held around the axis of the corresponding protrusions. Therefore, when the torsion coil spring is pressed along the inclined surface of each protrusion as shown in FIG. 8A, each end portion is fitted to the corresponding protrusion while being compressed in the axial direction by the guiding action of each inclined surface, and thus, the torsion coil spring can be supported by a one-touch operation.

In the invention of the above (4), since the spring holding portion has the recessed or notched shape formed around the protrusion, it is simple and easy to implement. On the contrary, in the invention of the above (5), since the protrusion is integrally formed with the first member or the second member, it can be implemented without increasing the number of parts.

In the invention of the above (6), as an application example of the above rotation mechanism, the first member and the second member are specified as the attachment base and the grip body constituting the assist grip described in the embodiment. However, in the above (1) to (5), the first member and the second member may have a relationship in which one member is relatively rotatably coupled to the other member.

BRIEF DESCRIPTION OF DRAWINGS

FIGS. 2A, 2B and 2C show an appearance of the assist grip. FIG. 2A is a top view, FIG. 2B is a front view, and FIG. 2C is a rear view.

FIGS. 9A and 9B correspond to FIG. 6 of Patent Document 1.

FIGS. 10A and 10B correspond to FIGS. 1B and 6B of Patent Document 2.

EMBODIMENT FOR CARRYING OUT INVENTION

Figure 1A:
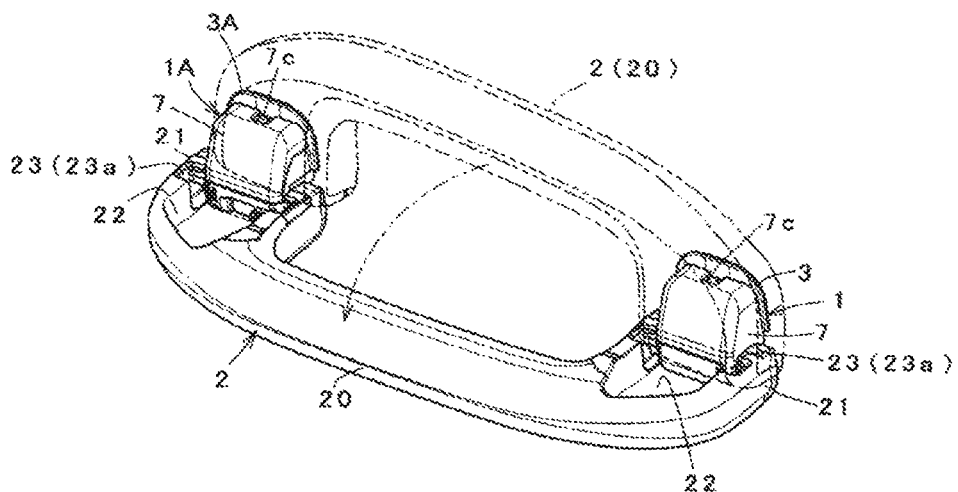
FIG. 1A is a schematic view showing a use state of an assist grip in an embodiment.

Hereinafter, an embodiment of the present invention will be described with reference to the drawings. In the following description, the operating features of a rotation mechanism of the present invention will be clarified while explaining in detail the overall structure of an assist grip to which the rotation mechanism is applied. Meanwhile, this embodiment is an example in which attachment bases 1, 1A or holding members 3, 3A correspond to the first member of the present invention, and a grip body 2 corresponds to the second member.

In FIGS. 1 to 8, an assist grip 15 includes the attachment bases 1, 1A mounted on a vehicle body, and the grip body 2 rotatably coupled and held to the attachment bases 1, 1A by pivots 36. Further, the attachment bases 1, 1A include the holding member 3 or 3A, metallic clips 4 and covers 7 attached to the holding member 3, 3A, a torsion coil spring 5 which is disposed in an accommodating portion 35 provided in the holding member 3 and urges one of the attachment base 1 and the grip body 2 to rotate relative to the other, and a damper 6 which is disposed in an accommodating portion 35a provided in the holding member 3A and brakes the rotational speed of the grip body 2. Meanwhile, all of the grip body 2, the holding members 3A, 3B, and the covers 7 are resin molded products, but other materials may be used.

Here, in the grip body 2, a substantially U-shaped intermediate portion is a gripping portion 20 to be grasped by hand, and each of both end portions 21 thereof has a cavity portion 22 in which the rear surface side is opened. Each cavity portion 22 has a size corresponding to the holding members 3, 3A and has hole portions 23 for pivotal support, which are provided to face each other on both right and left inner surfaces. Further, the cavity portion 22 in which the holding member 3 is disposed is provided with a spring locking recess 25 (see FIG. 5). The cavity portion 22 in which the holding member 3A is disposed is provided with stepped portions 26, 26a (see FIG. 4) that abut against a part of the damper 6, i.e., convex portions 8b, 8c of an outer cylinder (to be described later).

Figure 1B:
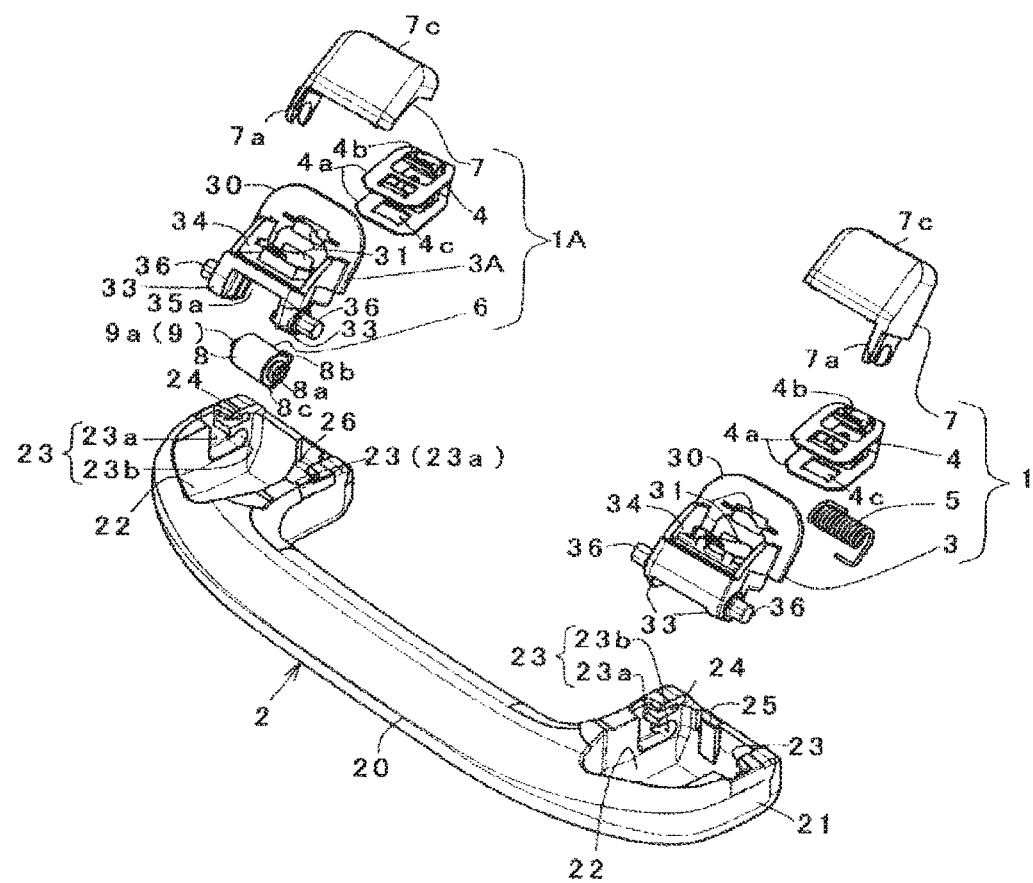
FIG. 1B shows a schematic exploded configuration of the assist grip in FIG. 1A.

Each hole portion 23 has a substantially L shape as shown in FIG. 1B and has an introduction hole 23a extending in a longitudinal direction from the rear surface of the end portion, and a shaft hole 23b extending horizontally from the inner side of the introduction hole 23a. A reference numeral 24 indicates an underfill portion which is provided on the upper side of the shaft hole 23b and is substantially parallel to the shaft hole 23b. The underfill portion 24 makes the wall portion, which defines the shaft hole 23b, between the shaft hole 23b and the underfill portion 24 elastically swingable. Thus, the pivot 36 can be rotated relative to the shaft hole 23b or the shaft hole 23b can be rotated relative to the pivot 36 with appropriate tension without rattling.

Figure 4:
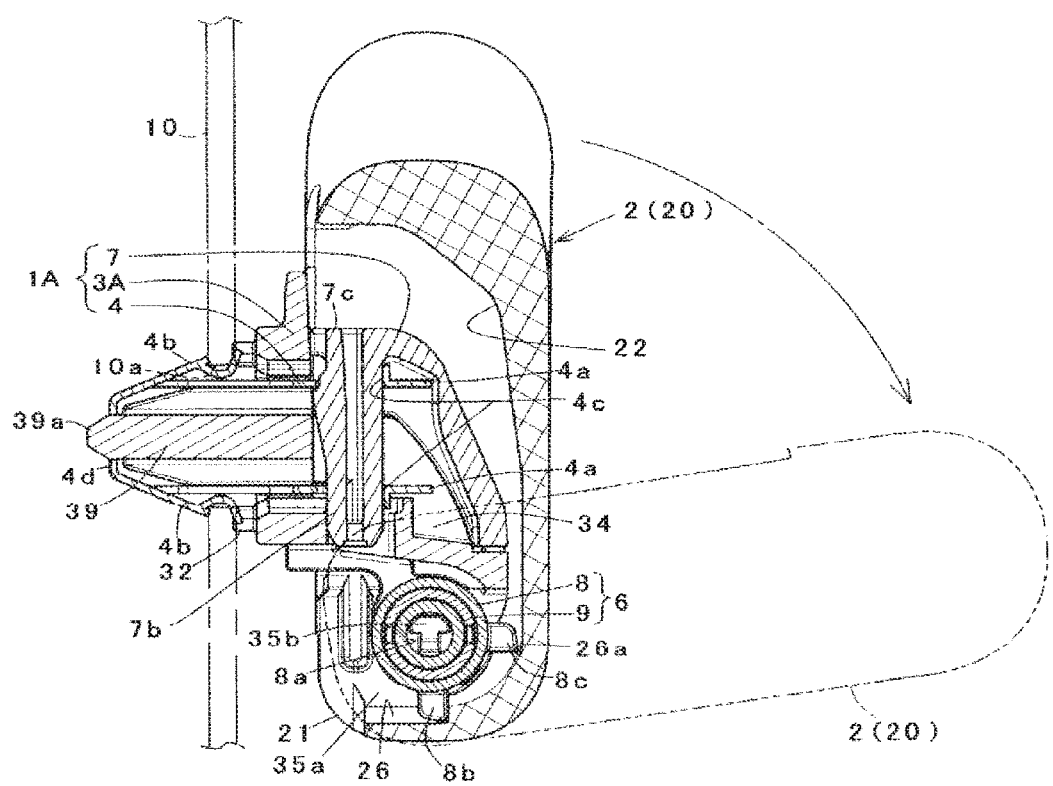
FIG. 4 is an enlarged sectional view taken along the line B-B in FIG. 2B.
Figure 5:
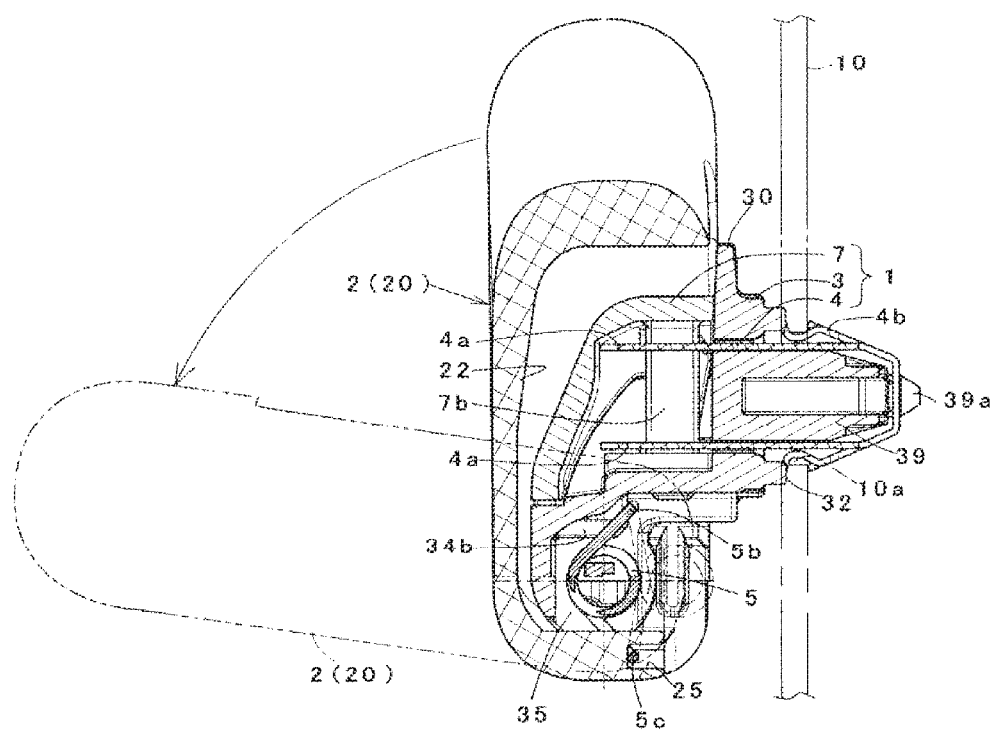
FIG. 5 is an enlarged sectional view taken along the line C-C in FIG. 2B.

On the other hand, the attachment bases 1, 1A in a state of being coupled and held to the above grip body 2 is coupled and held are attached to attachment holes 10a provided in a body panel 10 via the clip 4, as shown in FIGS. 4 and 5. In this case, the body panel 10 is covered with a ceiling trim (not shown), and the attachment bases 1, 1A are disposed on the ceiling trim. In the attachment base 1, the torsion coil spring 5 is disposed in the accommodating portion 35 provided in the holding member 3. In the attachment base 1A, the damper 6 is disposed in the accommodating portion 35a provided in the holding member 3A.

Figure 6A:
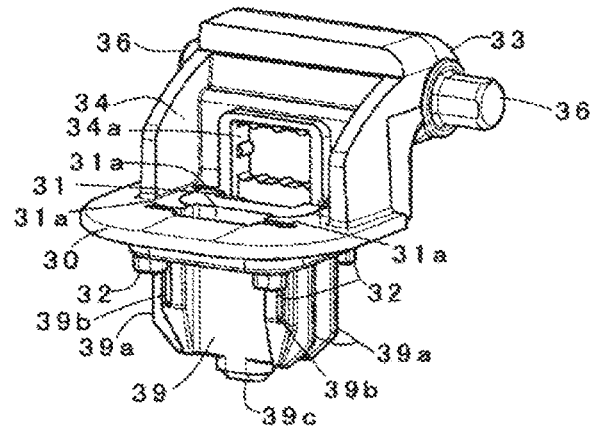
FIGS. 6A and 6B are schematic perspective views showing the relationship between a holding member constituting an attachment base and a torsion coil spring, as seen from different directions.
Figure 6B:
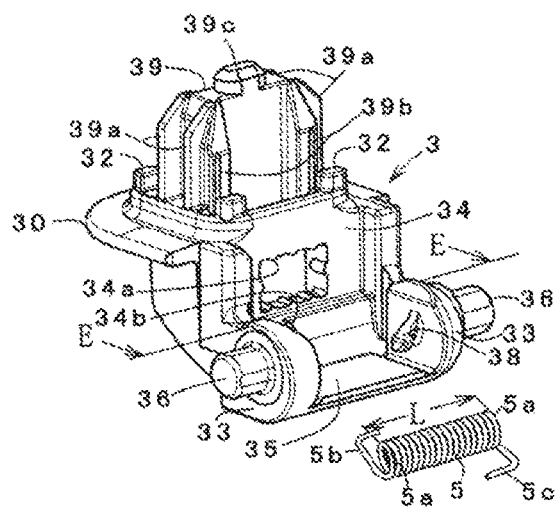
Figure 6C:
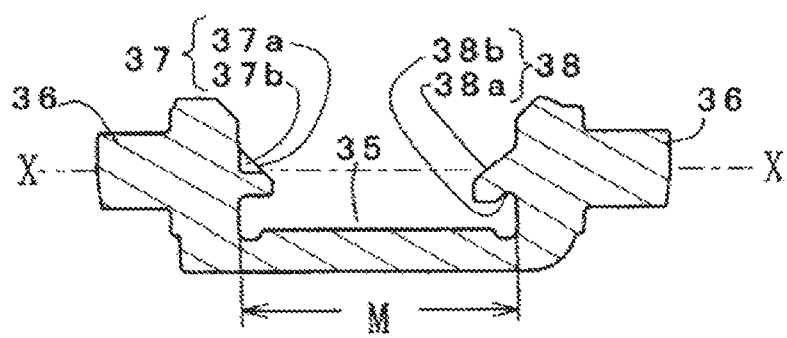
FIG. 6C is a sectional view taken along the line E-E in FIG. 6B.

Meanwhile, the attachment bases 1 and 1A, or, the holding members 3 and 3A have substantially the same shape except for the accommodating portions 35, 35a. Therefore, for the holding member 3A, the drawing corresponding to FIG. 6 is omitted. Further, in this embodiment, particularly, the holding structure of the torsion coil spring 5 and the damper 6 is enhanced as compared with the conventional structure as in Patent Document 2.

Figure 3A:
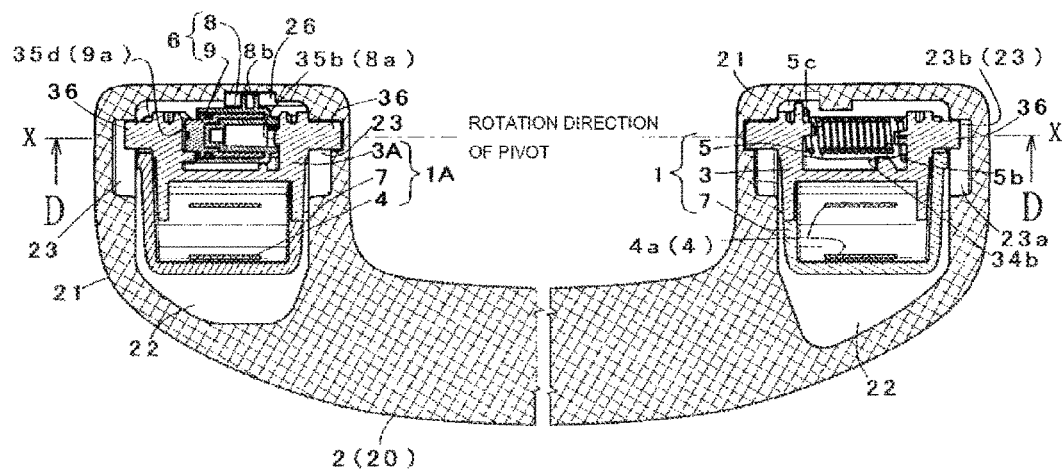
FIG. 3A is an enlarged sectional view taken along the line A-A in FIG. 2A.
Figure 3B:
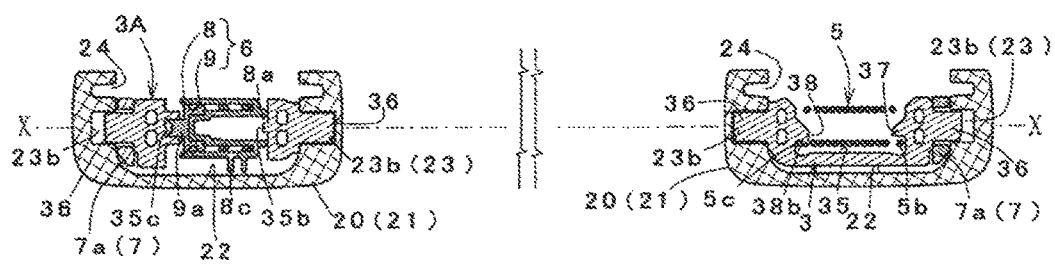
FIG. 3B is a sectional view taken along the line D-D in FIG. 3A.

As shown in FIG. 6, the torsion coil spring 5 is formed such that a length L of a coil winding portion is slightly longer than a gap M between both overhang portions 33. The torsion coil spring has linear abutting portions 5b, 5c formed by extending both end portions 5a of the coil shape. The damper 6 includes an outer cylinder 8 in which a circular cross-sectional space is formed within the wall thickness, and an inner cylinder 9 rotatably fitted into the circular space with a fluid contained therein, as shown in FIGS. 1B and 3B. The outer cylinder 8 has an opening 8a on one end side, and convex portions 8b, 8c (see FIG. 4) which are provided at two places on the outer periphery and engaged with the stepped portions 26, 26a so as to be integrally rotatable with the grip body 2. The inner cylinder 9 has a convex closed end portion 9a.

As shown in FIGS. 1 and 6, each of the holding members 3, 3A constituting each attachment base have a substantially rectangular substrate 30 arranged approximately at a middle portion in an up and down direction, a support part 34 protruding upward from the substrate 30, and a substantially tongue-like leg part 39 protruding downward from the substrate 30. Further, in each of the holding members 3, 3A, the metallic clip 4 is arranged inside the support part 34 from the leg part 39, and the cover 7 is attached to cover the inside of the support part 34.

The substrate 30 is provided with two through-holes 31 penetrating in the up and down direction. Each through-hole 31 is a rectangular opening provided in a middle portion in a right and left direction and has slits 31a provided on both sides of the opening. Convex portions 32 are provided at four corners on the lower surface of the substrate 30. The plate thickness of the leg part 39 is set such that it can be fitted between the through-holes 31. The leg part 39 has a pair of ribs 39a provided on both side surfaces and extending in the up and down direction, ribs 39b provided on the front and rear surfaces and extending in the up and down directions, and protrusions 39c protruding from a protruding end surface. The slit 31a is positioned between each rib 39b and the convex portion 32.

The support part 34 has an engaging hole 34a opened at the center portion, overhang portions 33 protruding rearward from both upper sides, a torsion coil spring accommodating portion 35 or a damper accommodating portion 35a defined between both overhang portions 33, pivots 36 protruding coaxially on an outer surface of each overhang portion 33, spring holding protrusions 37, 38 protruding from an inner surface of each overhang portion 33 defining the accommodating portion 35, and damper connection portions 35b, 35c (see FIG. 3B) protruding from an inner surface of each overhang portion 33 defining the accommodating portion 35a. The connection portion 35b has a substantially convex shape. The opening 8a on one end side of the outer cylinder is rotatably engaged with the connection portion 35b, as shown in FIG. 3. The connection portion 35c has a substantially concave shape. The closed end portion 9a of the inner cylinder is non-rotatably engaged with the connection portion 35c.

Next, the attachment structure of the clip 4 and the cover 7 to the above holding members 3, 3A will be clarified. As shown in FIG. 1B, the clip 4 has a substantially U shape and includes opposing plate portions 4a and a connection portion connecting both plate portions 4a to each other. Each of the plate portions 4a is provided with an elastic engaging claw 4b defined by a substantially U-shaped slit at a lower place and a latching hole portion 4c opened opposite to the upper side thereof. The connection portion is provided with a hole portion 4d (see FIG. 2C) to be engaged with the protrusion 39c. Then, the above clip 4 is assembled to the holding member 3 or 3A by inserting the leg part 39 between the plate portions 4a and engaging the protrusion 39c with the hole portion 4d. In the assembled state, the engaging claws 4b are disposed on the ribs 39b on the front and rear surfaces of the leg part 39, and each plate portion 4a is inserted into the through-hole 31 and the slits 31a corresponding thereto, so that the leading end side of the plate portion protrudes into the inner space of the support part 34.

As shown in FIGS. 1B, 4 and 5, the cover 7 has a shape covering the inner space of the support part 34 and has an attachment piece portion 7a protruding on the lower side of one side surface, and a locking arm portion 7b protruding on the inner lower side and inserted into the hole portion 4c of each plate portion on the clip side and the engaging hole 34a of the support part. The attachment piece portion 7a allows the cover 7 to be attached to the holding member 3 or 3A by engaging a concave portion provided on the lower end side with the corresponding pivot 36. The locking arm portion 7b has a frame-shaped longitudinal section and is formed so that one side of the frame shape can be swung by slits provided on both sides. Then, one side of the frame shape is elastically engaged with an edge of the hole portion 4c of the plate portion. Further, as shown in FIG. 4, a swinging end 7c extends on the upper surface of the cover, and thus, a releasing operation by a tool such as a driver can be performed. The above cover 7 is attached to the support part 34 by pressing the locking arm portion 7b into the hole portion 4c and engaging the attachment piece portion 7a with the corresponding pivot 36. In this attached state, the clip is prevented from being disengaged by the locking arm portion 7b inserted into the hole portion 4c of each plate portion in a skewered state.

The cover 7 is disengaged by pressing the swinging end 7c of the one side of the frame shape and being moved in a direction away from the support part 34.

Further, the accommodating portion 35 is provided between the overhang portions 33 and formed in a substantially L shape which is easy to receive the torsion coil spring 5. On a vertical wall surface of the L shape, a rib 34b is provided on the side close to the protrusion 37. The rib 34b is a portion for locking the one abutting portion 5b of the torsion coil spring 5. As shown in FIGS. 7 and 8, the pivots 36 and the protrusions 37, 38 are provided substantially on the same axis. That is, the pivots 36 on both sides are provided on the coaxial line. The protrusions 37, 38 are displaced from each other in the radial direction of the coil shape forming both end portions 5a of the torsion coil spring with respect to the axial direction X of the pivot 36.

Figure 7A:
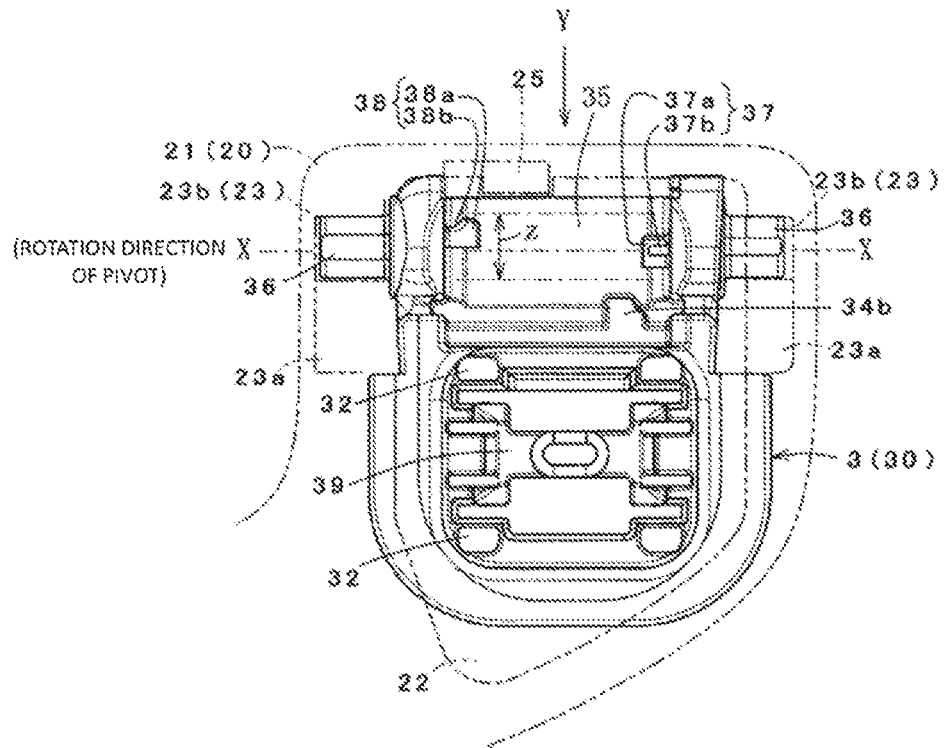
FIG. 7A is a view showing an operation of incorporating the torsion coil spring into the holding member.
Figure 7B:
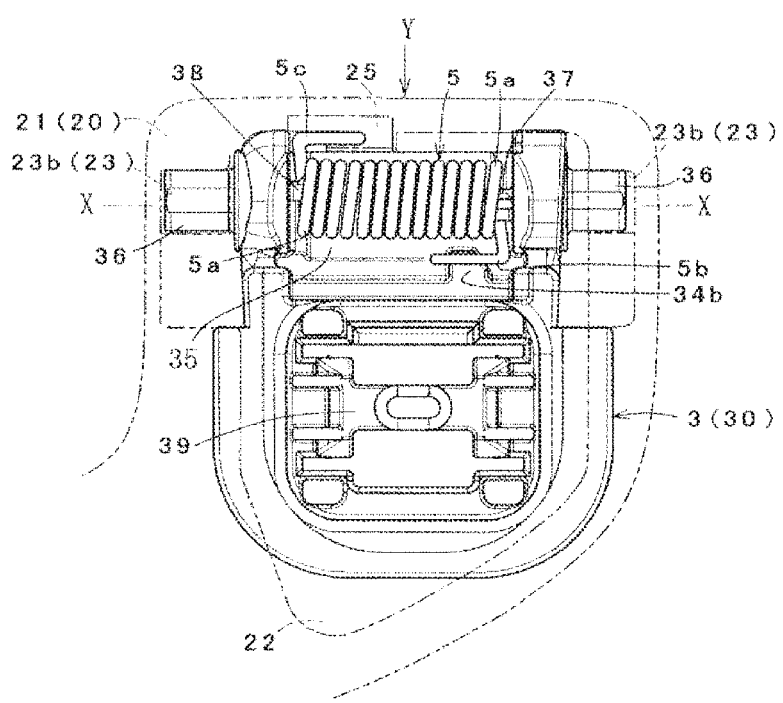
FIG. 7B is a view showing a state in which the torsion coil spring is incorporated in the holding member.

That is, the protruding positions of the protrusions 37, 38 are displaced from each other with respect to the Z direction in FIG. 7A that is a radial direction of the coil shape. Therefore, in the torsion coil spring 5, the coil portion of the coil shape forming the end portions 5a close to or in contact with the protrusion 37 and the coil portion thereof close to or in contact with the protrusion 38 are displaced in different directions in the state where both end portions 5a are held around the axes of the corresponding protrusions 37, 38. In this way, the movement in the radial direction of the torsion coil spring 5 is likely to be restricted by both protrusions, and thus, even the torsion coil spring with high torque is unlikely to be disengaged from the protrusions 37, 38.

Figure 8A:
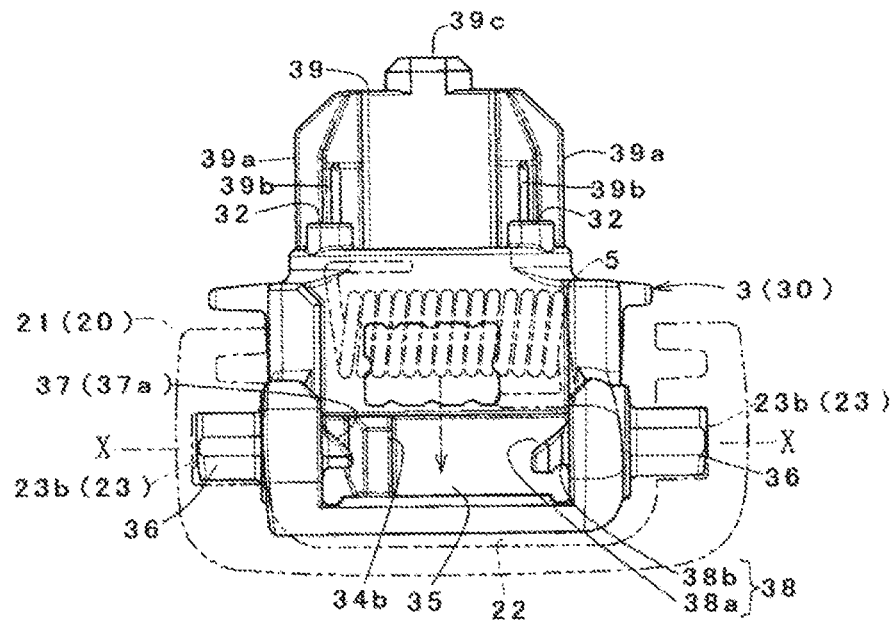
FIG. 8A is a view as seen from the Y direction in FIG. 7A.
Figure 8B:
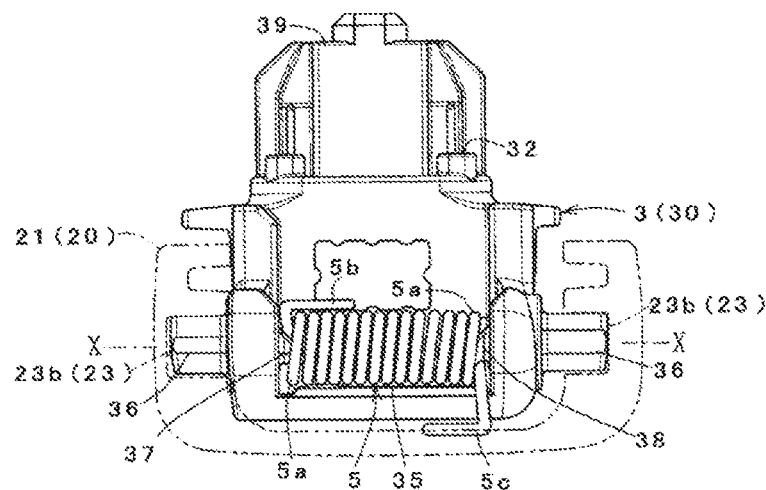
FIG. 8B is a view as seen from the Y direction in FIG. 7B.
Figure 9A:
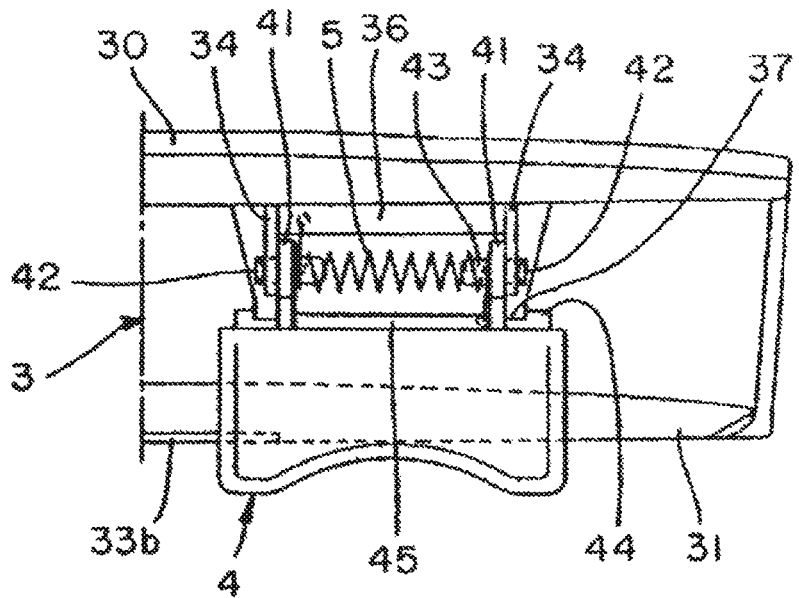
FIGS. 9A and 9B show a rotation mechanism disclosed in Patent Document 1.
Figure 9B:
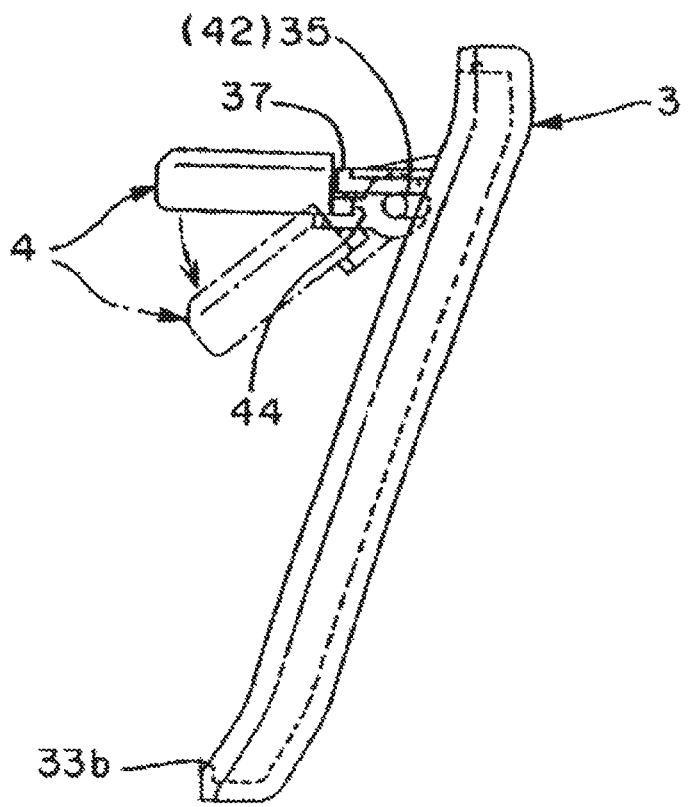
Figure 10A:
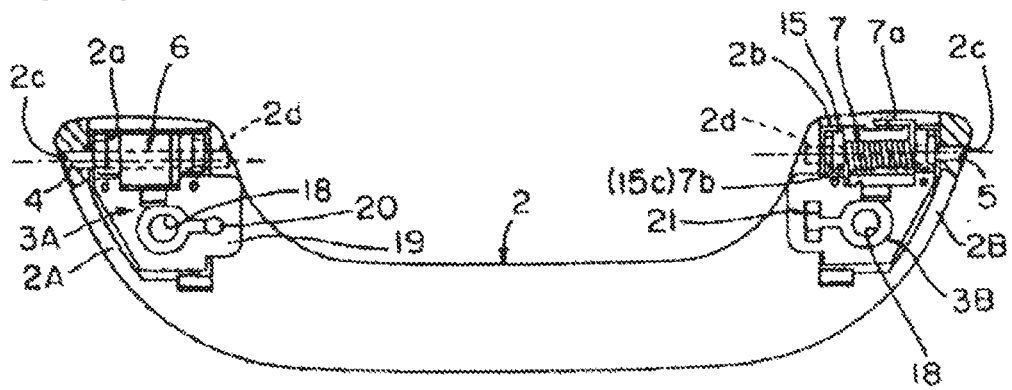
FIGS. 10A and 10B show a rotation mechanism disclosed in Patent Document 2.
Figure 10B:
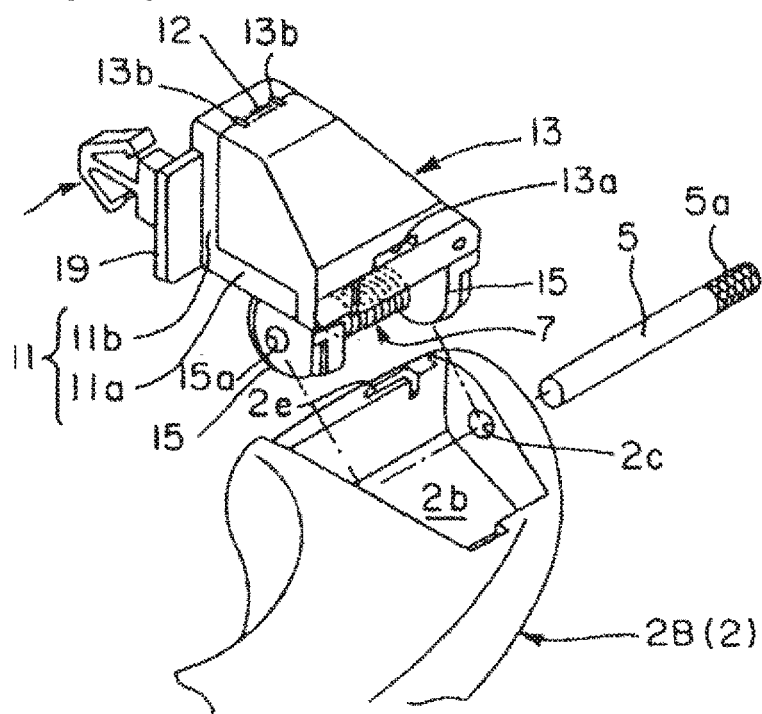

Further, as shown in FIG. 8A, the protrusions 37, 38 have inclined surfaces 37a, 38a which are provided on the same side and inclined downward from the top. As indicated by an imaginary line in FIG. 8A, the inclined surfaces 37a, 38a guide the torsion coil spring 5 to be axially compressed by guide action of the inclined surfaces 37a, 38a when the torsion coil spring 5 is pressed downward into the accommodating portion 35 from above and the end portions 5a of the coil shape are held around the protrusions 37, 38. In this way, in this embodiment, the torsion coil spring 5 can be held with respect to the protrusions 37, 38 by a one-touch operation. After the torsion coil spring 5 is held in the protrusions 37, 38, the one abutting portion 5b is engaged with the rib 34b and the other abutting portion 5c serving as an action end is engaged with the recess 25 against the urging force. Then, the grip body 2 is rotated by the urging force of the torsion coil spring 5, and an unused state where the grip body is disposed along the body panel 10 is obtained, as indicated by the solid line in FIGS. 2, 4 and 5.

Furthermore, the protrusion 38 has a recessed or notched spring holding portion 38b provided on the side opposite to the inclined surface 38a. The spring holding portion 38b is engaged with the abutting portion 5c of the above-described torsion coil spring 5 to restrict the movement of the end portion 5a of the coil shape connected to the abutting portion 5c. In this way, in the torsion coil spring 5, the abutting portion 5c as a movable action end is engaged with the spring holding portion 38b, and thus, the position thereof is restricted. Accordingly, even the torsion coil spring with high torque is unlikely to be disengaged from the protrusions 37, 38. According to this configuration, in addition to the restriction by the protrusions 37, 38 displaced from each other in the above-described Z direction, the movement of the abutting portion 5c is restricted by the spring holding portion 38b, so that the possibility of disengagement of the torsion coil spring 5 from the protrusions 37, 38 can be reliably eliminated. Meanwhile, the spring holding portion as described above is not provided on the protrusion 37, but may be provided on the protrusion 37 as necessary. Further, a reference numeral 37b indicates a concave portion.

On the contrary, the accommodating portion 35a has a shape recessed between the overhang portions 33 and the damper 6 is disposed between the overhang portions 33. The connection portions 35b, 35c are provided on the opposing inner surfaces of the overhang portions 33. Then, the damper 6 is incorporated into the accommodating portion 35a in a state in which the opening 8a on one end side of the outer cylinder is rotatably engaged with the convex connection portion 35b and the closed end portion 9a of the inner cylinder is fixedly engaged with the concave connection portion 35c.

Further, the above attachment bases 3 and 3A are placed in the cavity portions 22 in the end portions 21 of the grip body and are rotatably coupled and held by the pivots 36. In this coupling operation, the attachment base 3 or 3A is moved to the distal end side of the cavity portion 22 from the state where the pivots 36 on both sides of the holding member are respectively fitted into the introduction holes 23a on both sides of the cavity portion. In this way, the pivots 36 on both sides are fitted into the corresponding shaft holes 23b. Then, each of the attachment base 3 and 3A is rotatably attached to the grip body 2 by the pivots 36, thereby completing the assist grip 15 shown in FIG. 2.

In FIGS. 4 and 5, in the above assist grip 15, the grip body 2 is rotated from a storage position indicated by a solid line to a use position indicated by a dashed line against the urging force of the coil spring 5, and the grip body 2 is again rotated to the storage position by the urging force of the torsion coil spring 5 when hand is released from the use position. At that time, the grip body 2 is rotated while maintaining a state in which one of the stepped portions 26 and 26a is abutted against the convex portion 8b or the convex portion 8c of the outer cylinder. As a result, the outer cylinder 8 brakes together with the grip body 2 and is slowly rotated when being subjected to fluid resistance with respect to the inner cylinder 9.

Meanwhile, the rotation mechanism of the present invention may have the configuration specified in the above (1) or (2), and details thereof can be variously expanded according to the use or the like with reference to the embodiment. As an example, in the attachment base 1A, the damper 6 may be omitted, or, instead of the damper 6, the torsion coil spring 5 may be incorporated therein to provide the same configuration as the attachment base 1. Further, the clip 4 may be omitted, the leg portion 39 may be formed in an engageable shape, and the leg portion 39 may be fixedly engaged with, i.e., fastened to the attachment hole 10a of the panel.

This application is based on Japanese Patent Application (Patent Application No. 2015-041569) filed on Mar. 3, 2015, the contents of which are incorporated herein by reference.

What is claimed is:

1. A rotation mechanism comprising:
a first member;
a second member which is rotatably coupled to the first member by a pivot; and
a torsion coil spring configured to urge one of the first member and the second member to rotate relative to the other,
wherein any one of the first member and the second member has a torsion coil spring accommodating part in which a pair of protrusions facing each other in an axial direction of the pivot is provided,
wherein the torsion coil spring includes abutting portions formed by extending both end portions of a coil shape, and each of the abutting portions is arranged to abut against different one of the first member and the second member, and
wherein the pair of protrusions holds the both end portions of the coil shape of the torsion coil spring around axes of the protrusions, and at least one of the protrusions has a spring holding portion provided at a place receiving reaction force from a corresponding abutting portion side of the torsion coil spring.

2. The rotation mechanism according to claim 1, wherein the spring holding portion has a recessed or notched shape formed around the protrusions.

3. The rotation mechanism according to claim 2, wherein the pair of protrusions has inclined surfaces inclined downwardly toward each other in the axial direction to cause the torsion coil spring to be compressed in the axial direction when the both end portions of the coil shape of the torsion coil spring are held around the corresponding axes.

4. The rotation mechanism according to claim 3, wherein the protrusions are integrally formed with the first member or the second member.

5. The rotation mechanism according to claim 4, wherein the first member is an attachment base adapted to be attached to a body panel, and the second member is a grip body.

6. The rotation mechanism according to claim 1, wherein the pair of protrusions has inclined surfaces inclined downwardly toward each other in the axial direction to cause the torsion coil spring to be compressed in the axial direction when the both end portions of the coil shape of the torsion coil spring are held around the corresponding axes.

7. The rotation mechanism according to claim 1, wherein the protrusions are integrally formed with the first member or the second member.

8. The rotation mechanism according to claim 1, wherein the first member is an attachment base adapted to be attached to a body panel, and the second member is a grip body.

9. The rotation mechanism according to claim 1, wherein the second member further includes a spring locking recess arranged toward a first protrusion of the pair of protrusions in the axial direction more than a second protrusion of the pair of protrusions, and
the abutting portions include a first abutting portion at one of the both end portions of the coil shape, the first abutting portion having
a first portion extending outwardly in the radial direction from the coil shape and abutting against the spring holding portion, and
a second portion extending from the first portion in the axial direction and arranged in the spring locking recess.

10. The rotation mechanism according to claim 9, wherein the first member includes the torsion coil spring accommodating part and further includes a rib arranged in the torsion coil spring accommodating part, the rib being arranged toward the second protrusion in the axial direction more than the first protrusion and extending toward the torsion coil spring, and
the abutting portions include a second abutting portion at another of the both end portions of the coil shape opposite to the one of the both end portions in the axial direction, the second abutting portion having
a third portion extending outwardly in the radial direction from the coil shape, and
a fourth portion extending from the third portion in the axial direction and abutting against the rib.

11. The rotation mechanism according to claim 10, wherein
the first protrusion is arranged to deviate from a center axis of the pivot in a radial direction of the pivot and extends in the axial direction to support the one of the both end portions of the torsion coil spring, the first protrusion including
the spring holding portion having a recessed shape to receive the first portion of the first abutting portion, and
an inclined surface arranged opposite to the spring holding portion in the radial direction, and
the second protrusion is arranged coaxially to the pivot and extends in the axial direction to support the another of the both end portions of the torsion coil spring, the second protrusion including another inclined surface inclined downwardly in the radial direction toward the inclined surface of the first protrusion.

* * * * *